United States Patent
Dacosta

(10) Patent No.: US 6,264,135 B1
(45) Date of Patent: Jul. 24, 2001

(54) INFLIGHT AIRCRAFT VISUAL MONITORING APPARATUS

(76) Inventor: John Dacosta, Box 31717, Seven Mile Beach, Grand Cayman (KN)

(*) Notice: Subject to any disclaimer, the term of this patent is extended or adjusted under 35 U.S.C. 154(b) by 0 days.

(21) Appl. No.: 09/504,045

(22) Filed: Feb. 14, 2000

(51) Int. Cl.⁷ .................................................. B64D 47/08
(52) U.S. Cl. .................... 244/1 R; 244/121; 244/129.1; 348/117; 340/945; 340/963
(58) Field of Search .................. 244/1 R, 118.1, 244/118.5, 129.1; 340/963, 973, 945; 348/117, 148; 360/5

(56) References Cited

U.S. PATENT DOCUMENTS

| | | | |
|---|---|---|---|
| 4,816,828 | * 3/1989 | Feher | 244/1 R |
| 5,283,643 | * 2/1994 | Fujimoto | 340/973 |
| 5,667,170 | * 9/1997 | Moss et al. | 244/135 A |
| 6,009,356 | * 12/1999 | Monroe | 340/963 |

* cited by examiner

Primary Examiner—Galen L. Barefoot
(74) Attorney, Agent, or Firm—Robert J. Vanderwall

(57) ABSTRACT

Disclosed is a first miniature digital video camera in a streamlined configuration mounted on or in proximity to the vertical stabilizer of an aircraft and in communication preferably with both remote digital video recording apparatus and at least one cockpit video monitor. The video recording apparatus is preferably one or more channels on the flight data recorder for postcrash investigation. The preferred embodiment would employ two video cameras, one on anterior or front of the tail assembly, and one of the posterior or rear of it. One alternative embodiment would consist of only one video camera, fastened to an extension of the tail assembly. The second preferred embodiment would include two video cameras, one of which would be mounted on the posterior end of the tail assembly, the other on the under side of the plane, just behind the wings.

2 Claims, 3 Drawing Sheets ed to facilitates postcrash National Transportation Safety Board (NTSB) or similar investigative agency determination of crash causes and safety improvements.

INFLIGHT AIRCRAFT VISUAL MONITORING APPARATUS

BACKGROUND OF THE INVENTION

1. Field of the Invention

The present invention relates generally to the field of aviation safety equipment, and specifically concerns apparatus that allows the cockpit crew of an inflight aircraft to visually monitor using at least one externally mounted digital video camera the positioning and deployment of various flight control surfaces. It further includes connection to the flight data recorder to provide a visual record of data in the event of a crash for subsequent analysis of functioning or malfunctioning of the various flight control surfaces. This facilitates postcrash National Transportation Safety Board (NTSB) or similar investigative agency determination of crash causes and safety improvements.

2. Description of the Prior Art

It has always been an object of aviators to improve the monitoring and control of inflight aircraft, as well as to utilize the experience of prior flights to improve the safety of aircraft and the techniques of safe aircraft operation. In the present day of high capacity aircraft, when an airliner crashes the loss of life is often enormous.

Much investigative attention in such tragedies is then frequently focused on the so-called "black boxes" carried by all modern airliners, which are more properly called the flight data recorder and the cockpit voice recorder. The flight data recorder comes in various models depending on the age of the aircraft in which it was installed. That is because the Federal Aviation Adminstration (FAA) has mandated an increasing number of variables to be monitored in order to provide an ever increasing amount of data for postcrash investigation, and because constantly improving technology has made the collection of so much data readily achievable. The cockpit voice recorder records on a loop the last time period of sounds in the cockpit including the speech of the pilots and sounds made by cockpit instruments and ambient conditions.

In the last several years, single airliner crashes (as opposed to two or more aircraft in a collision) over deep water without readily apparent causes have led to ever increasing emphasis on the importance of the control, real time monitoring, and recording of data concerning the operating parameters of the aircraft immediately prior to crashing. In part that is because such catastrophic aircraft failures usually leave no one alive to assist in the investigation of the cause or causes.

In addition, although cockpit instruments provide some real time information on the positioning of external various flight control surfaces, and flight data recorders provide some information on such positioning after a crash, pilots cannot actually see many of the flight control surfaces either from the cockpit or from other windows in the plane. This is particularly true of all the vital control surfaces on the tail of the aircraft including elevators, rudder and trim tabs.

At the same time great strides have been made in the field of cameras, particularly digital video cameras and lenses. Miniaturization of such cameras and sophisticated control techniques makes it feasible to mount, control and operate them with a minimum of space and in very hostile environments. This, in turn, allows use of such cameras in the conditions found outside of a modern airliner in flight and at cruise altitude, e.g., with airspeeds to nearly 600 miles per hour and outside air temperatures down to about 60 or 70 degrees below zero fahrenheit.

SUMMARY OF THE INVENTION

Bearing in mind the foregoing, it is a principal object of the present invention to provide a means for the cockpit crew of an inflight aircraft to remotely visually monitor the positioning and deployment of various flight control surfaces.

It is another object of the present invention to provide at least one externally mounted digital video camera on the exterior of an aircraft to furnish the source of data for both visual real time monitoring of external control surfaces of an inflight aircraft, and for recording such data in the flight data recorder.

It is related object of the present invention to provide improved safety in the aviation industry by providing visual data that can be used both by pilots in real time to troubleshoot control problems of aircraft in flight, and by crash investigators to more positively identify and correct external flight control surface anomalies after crashes have taken place.

It is a further object of the present invention to provide all of the foregoing objects and advantages using small, reliable, streamlined, lightweight and relatively inexpensive equipment that will accomplish the foregoing without any significant degradation in the speed or efficiency of the aircraft or its cost of manufacture and maintenance.

Other objects and advantages will become apparent to those skilled in the art upon reference to the following descriptions and the appended drawings.

In accordance with a principal aspect of the invention there is provided at least one miniature digital video camera in a streamlined configuration mounted on or in proximity to the vertical stabilizer of an aircraft and in communication preferably with both remote digital video recording apparatus and at least one cockpit video monitor. The preferred embodiment would employ two video cameras, one on anterior or front of the tail assembly, and one of the posterior or rear of it. One alternative embodiment would consist of only one video camera, fastened to an extension of the tail assembly. The second preferred embodiment would include two video cameras, one of which would be mounted on the posterior end of the tail assembly, the other on the underside of the plane, just behind the wings. Other locations are within the contemplation of the inventor.

The video camera(s) may alternatively be equipped with direction control means to facilitate pointing the lens at all different control surfaces including but not limited to rudder, elevators, trim tabs, engine thrust reversers, ailerons, flaps, air brakes, spoilers, landing gear, and the like. The remote digital video recording apparatus will preferably be a part of the flight data recorder so that postcrash investigators will be able to see the deployment and positioning of control surfaces during the time immediately preceding the crash. A plurality of such miniature digital video cameras may be employed to allow simultaneous monitoring of tail assembly, wings and undercarriage without using direction control means, since doing so may sacrifice some views for postcrash investigation.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
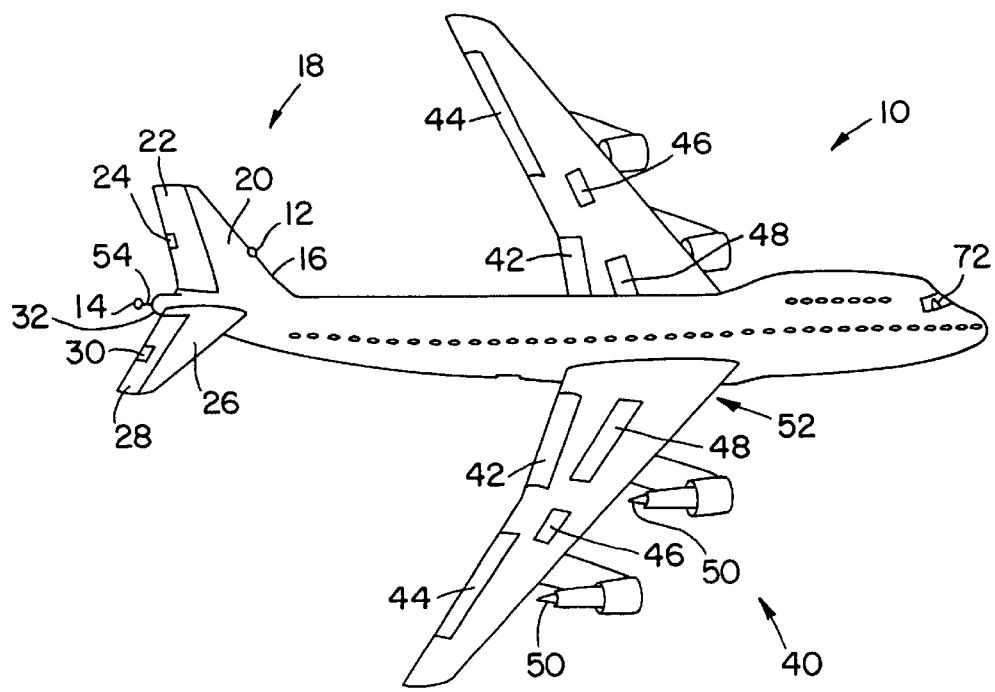
FIG. 1 is a perspective view of a Boeing 747 aircraft in flight showing the preferred embodiment of the location of two digital video cameras used to monitor in real time the control surfaces of the aircraft. A first camera is mounted at the anterior end of the tail assembly, the second at the posterior end of the tail assembly.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

First Preferred Embodiment

FIG. 1 is a perspective view of a Boeing 747-300 aircraft 10 in flight showing the preferred embodiment of the location of two digital video cameras 12, 14 used to monitor in real time the various control surfaces of the aircraft. A first camera 12 is mounted at the anterior end 16 of the tail assembly 18. The tail assembly is comprised of the vertical stabilizer 20, rudder 22, rudder trim tab 24, horizontal stabilizer 26, elevators 28, elevator trim tab(s) 30, and posterior end 32 of tail assembly 18. The second video camera 14 is disposed at the posterior end 32 of the tail assembly 18.

In use, the first video camera 12 is aimed generally forward and slightly downward to see the control surfaces on or near the main wings 40. These include the flaps 42, ailerons 44, air brakes 46, spoilers 48, engine thrust reversers 50, and landing gear 52. The second video camera 14 is mounted on posterior bracket 54 so that is can be aimed forward and upward even though it is mounted on the posterior end 32 of tail assembly 18. In use the second video camera 14 sees the rudder 22, rudder trim tab 24, elevators 28, and elevator trim tab(s) 30.

Alternative Embodiment

Figure 2:
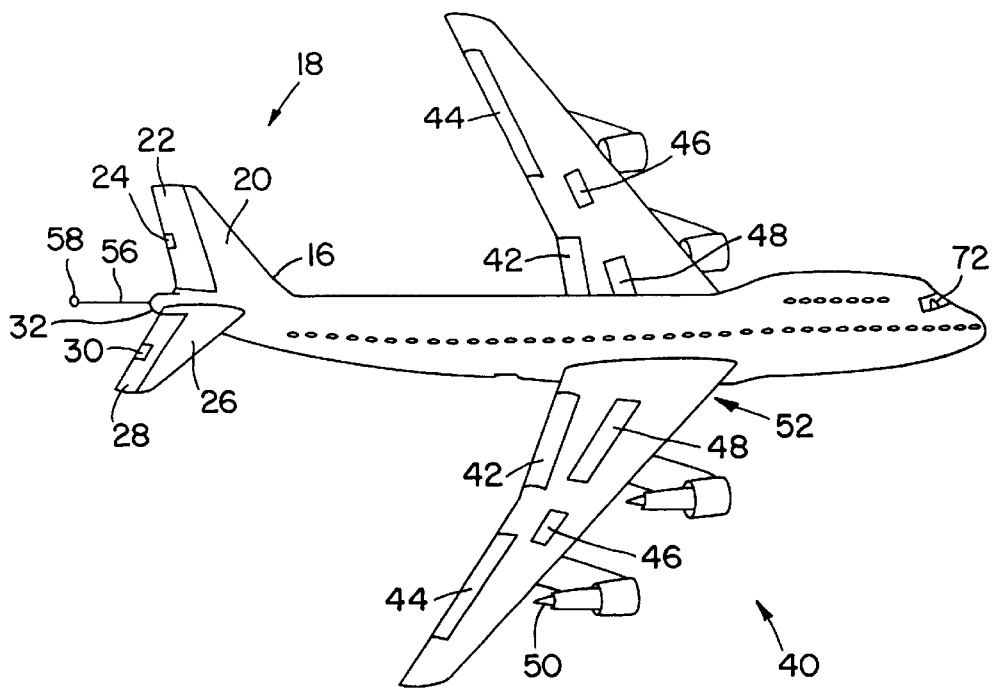
FIG. 2 is a similar perspective view showing the location of a video camera located at the posterior end of the tail assembly. As only one video camera is employed, it is necessary to fasten it to an extension, so that the back of the plane does not obscure the view of the control surfaces on the main wings.

FIG. 2 is a similar perspective view of a Boeing 747-300 aircraft 10 in flight. At the posterior end 32 of the tail assembly 18 is extension member 56, at the distal end of which is mounted wide angle video camera 58 so that the back of the plane does not obscure the view of the control surfaces on the main wings. The wide angle video camera 58 is aimed forward and slightly above level. Because a wide angle lens is used and the camera 58 is disposed at the end of extension member 56, it can see both the control surfaces of tail assembly 18 and the control surfaces in proximity to main wings 40.

Second Preferred Embodiment

Figure 3:
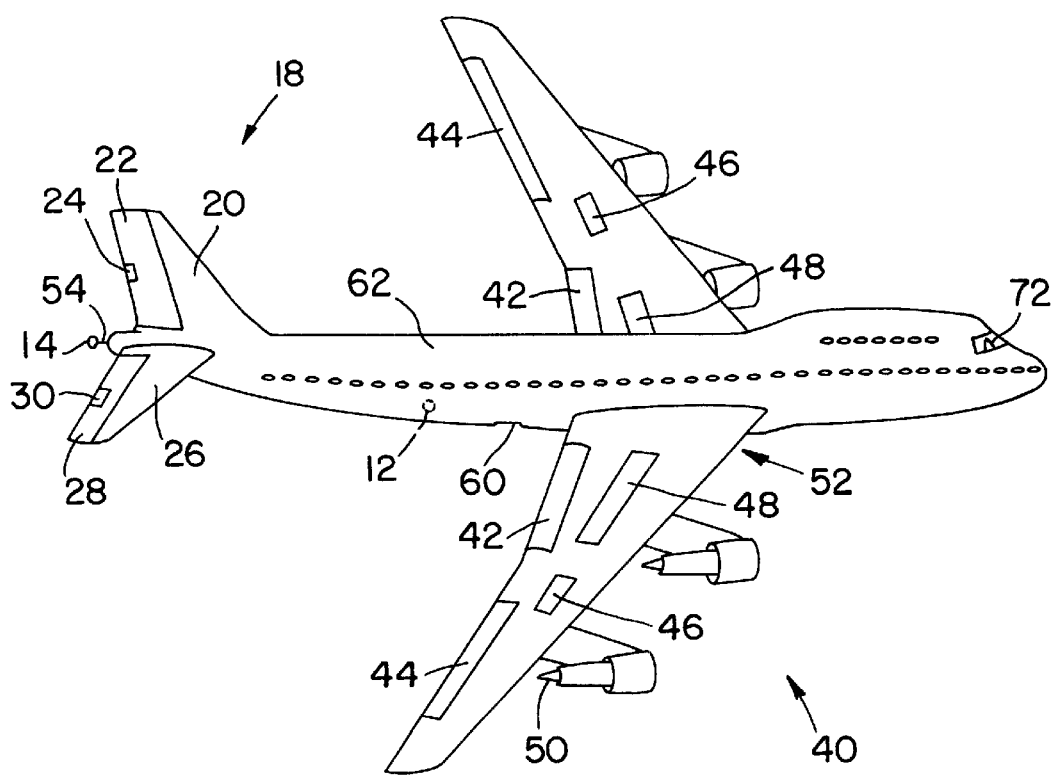
FIG. 3 is a similar perspective view showing the locations of two video cameras, a first located on the underside of the plane, just behind the main wings and shown in phantom, the second at the posterior of the tail assembly in the same manner as the second camera in the first preferred embodiment.

FIG. 3 is a similar perspective view showing the second preferred embodiment of video camera placement. The first video camera 12 is located on the underside 60 of fuselage 62 just behind the main wings 40, and is shown in phantom. It is aimed level forward and thus is disposed to see all control surfaces on or near main wings 40. The second video camera 14 is mounted at the posterior end 32 of the tail assembly 18 in the same manner as described in connection with the first preferred embodiment.

Figure 4:
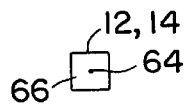
FIG. 4 is a perspective view of a miniature video camera showing its pin hole lens and transparent protective cover.

FIG. 4 is a perspective view of a miniature video camera 12 showing its pin hole lens 64 and transparent protective cover 66.

Figure 5:
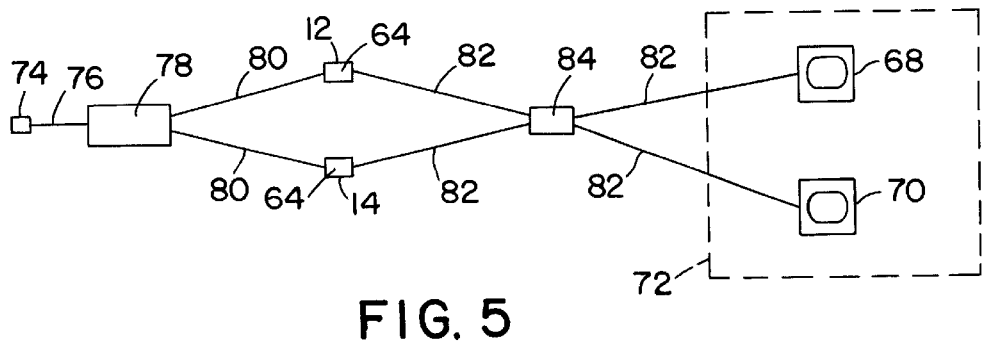
FIG. 5 is a schematic drawing showing the preferred embodiment of the complete system, using two video cameras and two video monitors in the cockpit.

FIG. 5 is a schematic drawing showing the preferred embodiment of the complete system, using two video cameras 12, 14 and two video monitors 68, 70 in the cockpit 72. Power supply 74 is wired 76 to recording device 78. Since the inventive inflight aircraft visual monitoring apparatus will be retrofitted in its early years to existing aircraft, recording device 78 will frequently be a stand alone device, but on new aircraft it is at least one more channel on the flight data recorder, two with the preferred embodiment.

In any event, recording device 78 is wired 80 to video cameras 12, 14. Video cameras 12, 14 are also wired 82 through switch 84 to video monitors 68, 70 in the cockpit 72. Switch 84 allows the pilots to connect the video monitor 68, 70 to either of the video cameras 12, 14.

Figure 6:
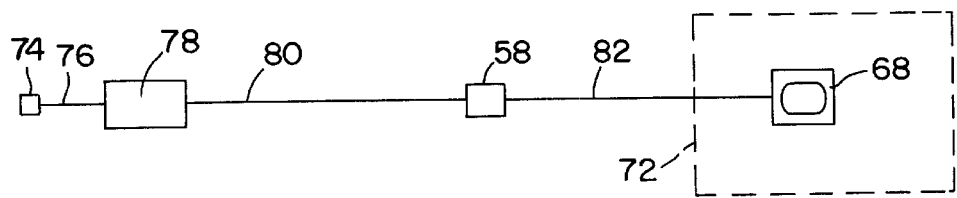
FIG. 6 is a schematic drawing showing the alternative embodiment of the complete system, using a single video camera and a single video monitor in the cockpit.

FIG. 6 is a schematic drawing showing the alternative embodiment of the complete system, using wide angle video camera 58 and a single video monitor 68 in the cockpit 72. Power supply 74 is wired 76 to recording device 78. Recording device 78 is wired 80 to wide angle video camera 58. Wide angle video camera 58 is also wired 82 to video monitor 68 in the cockpit 72.

Figure 7:
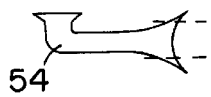
FIG. 7 is a posterior bracket for mounting the second video so that is can be aimed forward and upward even though it is mounted on the posterior end of tail assembly.

FIG. 7 shows the posterior bracket 54 so that camera can be aimed forward and upward even though it is mounted on the posterior end 32 of tail assembly 18.

Figure 8:
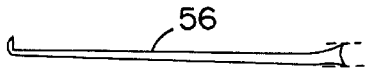
FIG. 8 is an extension member for mounting a wide angle video camera far enough from the back of the plane so that the latter does not obscure the view of the control surfaces on the main wings.

FIG. 8 is an extension member 56 which in combination with the use of a wide angle lens allows wide angle camera 58 to view both the control surfaces of tail assembly 18 and the control surfaces on or near main wings 40. Extension member 56 is for mounting a wide angle video camera far enough from the back of the plane so that the latter does not obscure the view of the control surfaces on the main wings 40.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended and their equivalents.

What is claimed is:

1. An inflight aircraft visual monitoring apparatus comprising:

an extension member attached to a posterior end of an aircraft tail assembly;

a single wide angle video camera disposed on an exterior of an aircraft at a distal end of the extension member and aimed to view both control surfaces of the aircraft tail assembly and control surfaces in proximity to aircraft main wings;

a recording device in communication with the video camera; and at least one video monitor in communication with the video camera and disposed in the aircraft cockpit.

2. The apparatus of claim 1 in which the recording device is a flight data recorder.

* * * * *